(12) United States Patent
Kanemitsu et al.

(10) Patent No.: US 9,119,991 B2
(45) Date of Patent: *Sep. 1, 2015

(54) GOLF BALL RESIN COMPOSITION AND GOLF BALL

(71) Applicant: Dunlop Sports Co. Ltd., Kobe-shi, Hyogo (JP)

(72) Inventors: Yumi Kanemitsu, Kobe (JP); Ryo Murakami, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 146 days.

This patent is subject to a terminal disclaimer.

(21) Appl. No.: 13/730,226

(22) Filed: Dec. 28, 2012

(65) Prior Publication Data

US 2013/0172112 A1    Jul. 4, 2013

(30) Foreign Application Priority Data

Dec. 29, 2011    (JP) .................. 2011-290329

(51) Int. Cl.
*A63B 37/00*    (2006.01)
*C08K 5/19*    (2006.01)
*C08K 5/17*    (2006.01)
*C08F 22/02*    (2006.01)

(52) U.S. Cl.
CPC ......... *A63B 37/0059* (2013.01); *A63B 37/0051* (2013.01); *A63B 37/0073* (2013.01); *C08F 22/02* (2013.01); *C08K 5/17* (2013.01); *C08K 5/175* (2013.01); *C08K 5/19* (2013.01)

(58) Field of Classification Search
None
See application file for complete search history.

(56) References Cited

U.S. PATENT DOCUMENTS

| | | | | |
|---|---|---|---|---|
| 5,474,776 | A | * | 12/1995 | Koyanagi et al. ............. 424/401 |
| 6,656,892 | B2 | * | 12/2003 | Oshimura ..................... 510/124 |
| 2006/0014898 | A1 | | 1/2006 | Kim |
| 2009/0203469 | A1 | * | 8/2009 | Sullivan ........................ 473/374 |
| 2010/0048327 | A1 | * | 2/2010 | Bulpett et al. ................ 473/374 |
| 2010/0298066 | A1 | | 11/2010 | Kim |
| 2013/0079178 | A1 | * | 3/2013 | Shiga et al. ................... 473/371 |
| 2014/0031145 | A1 | * | 1/2014 | Kitamura et al. ............. 473/372 |

FOREIGN PATENT DOCUMENTS

JP    2006-28517 A    2/2006
JP    2009197088    *    9/2009

OTHER PUBLICATIONS

Chem Net web page for Lauryl Betaine; no date.*
Chem Net web page for Oleyl Betaine; no date.*

* cited by examiner

*Primary Examiner* — David Buttner
(74) *Attorney, Agent, or Firm* — Birch, Stewart, Kolasch & Birch, LLP

(57) ABSTRACT

The present invention provides a golf ball resin composition comprising (A) an ionomer resin component and (B) a compound having an anionic part within a molecule thereof, wherein with respect to a metal ion contained in the golf ball resin composition, (A) the ionomer resin component and (B) the compound having the anionic part within the molecule thereof, following coordinate energies obtained by ab initio molecular orbital calculation method using a basis function B3LYP/6-31G(d) satisfy the following expression: $0.3 \leq (A-C)/(B-C) \leq 0.6$, wherein coordinate energy A is the coordinate energy between the metal ion and the anionic part of (B) component, coordinate energy B is the coordinate energy between the metal ion and the carboxyl ion of (A) component, and coordinate energy C is the coordinate energy between the metal ion and the olefin of (A) the ionomer resin component.

14 Claims, 2 Drawing Sheets

GOLF BALL RESIN COMPOSITION AND GOLF BALL

FIELD OF THE INVENTION

The present invention relates to an improvement in a golf ball resin composition containing an ionomer resin.

DESCRIPTION OF THE RELATED ART

As a golf ball construction, for example, a one-piece golf ball comprising a golf ball body, a two-piece golf ball comprising a core and a cover, a three-piece golf ball comprising a core consisting of a center and a single-layered intermediate layer covering the center, and a cover covering the core, and a multi-piece golf ball comprising a core consisting of a center and at least two intermediate layers covering the center, and a cover covering the core are known.

As materials constituting each layer of golf balls, materials having high resilience are required and ionomer resins are used. Use of the ionomer resins for the constituent member of the golf ball provides the golf ball traveling a great distance, because of its high stiffness. It is known that the resilience of the ionomer resins can be improved by increasing the neutralization degree thereof. However, since the hardness of the ionomer resins gets higher when increasing the neutralization degree thereof, the shot feeling is lowered because of the insufficient flexibility.

On this point, adding a great amount of a fatty acid (metal soap) to the ionomer resins having a high degree of neutralization to lower the hardness of the ionomer resins while enhancing the resilience thereof has been proposed. However, since a metal ion to be used for neutralizing the ionomer resin is also used for an acid component of the fatty acid, an effect of a higher resilience by a high degree of neutralization is not obtained sufficiently. From the aspect of striking a balance between resilience and shot feeling of the golf ball, the flexibility and resilience are not sufficient. Further, a great amount of the metal component is required.

Japanese Patent Publication No. 2006-28517 A discloses a golf ball material using an ionomer resin and a compound having both an acid and an amine functional group in the same molecule. However, there still reminds a room for further improvement with respect to striking a balance between the flexibility and the high resilience.

SUMMARY OF THE INVENTION

The present invention has been achieved in view of the above circumstances. An object of the present invention is to provide a golf ball resin composition excellent in resilience and flexibility. Another object of the present invention is to provide a golf ball excellent in a shot feeling and resilience.

The present invention which has solved the above problems provides a golf ball resin composition comprising (A) at least one resin component selected from the group consisting of (a-1) a binary copolymer composed of an olefin and an α,β-unsaturated carboxylic acid having 3 to 8 carbon atoms; (a-2) an ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms and an α,β-unsaturated carboxylic acid ester; and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, and (B) a compound having an anionic part within a molecule thereof, provided that the golf ball resin composition further contains (C) a basic inorganic metal compound in the case of containing only (a-1) the binary copolymer and/or (a-3) the ternary copolymer as (A) the resin component, wherein with respect to a metal ion contained in the golf ball resin composition, (A) the resin component and (B) the compound having the anionic part within the molecule thereof, following coordinate energies obtained by ab initio molecular orbital calculation method using a basis function B3LYP/6-31G(d) satisfy a following expression: $0.3 \leq (A-C)/(B-C) \leq 0.6$.

Coordinate energy A (kcal/mol): coordinate energy between the metal ion and the anionic part of (B) component,
Coordinate energy B (kcal/mol): coordinate energy between the metal ion and the carboxyl ion of (A) component,
Coordinate energy C (kcal/mol): coordinate energy between the metal ion and the olefin of (A) component.

The reasons why the golf ball resin composition of the present invention is soft in spite of being excellent in resilience are considered as follows. In the present invention, by adding (B) the compound having the anionic part within the molecule thereof which comprises an appropriate affinity for an ion association formed by (A) the resin component, (B) the compound having the anionic part within the molecule thereof can be present near the ion association formed by (A) the resin component. As a result, it is conceivable that (B) the compound having the anionic part within the molecule thereof (I) finely disperses the ion association and inhibits crystallization of ethylene chains, and (II) weakens constraining of main chains by the ion association. With these actions, the mobility of a molecular chain of the ionomer resin increases, and the resilience increases while maintaining the flexibility.

In the present invention, the affinity of the ion association of the ionomer resin and (B) the compound having the anionic part within the molecule thereof is evaluated by coordinate energies obtained by ab initio molecular orbital calculation method using a basis function B3LYP/6-31G(d). That is, with respect to the metal ion contained in the golf ball resin composition, (A) the resin component, and (B) the compound having the anionic part within the molecule thereof, following coordinate energies obtained by ab initio molecular orbital calculation method using a basis function B3LYP/6-31G(d) satisfy a following expression:

$$0.3 \leq (A-C)/(B-C) \leq 0.6.$$

Coordinate energy A (kcal/mol): coordinate energy between the metal ion and the anionic part of (B) component,
Coordinate energy B (kcal/mol): coordinate energy between the metal ion and the carboxyl ion of (A) component,
Coordinate energy C (kcal/mol): coordinate energy between the metal ion and the olefin of (A) component.

If the value of (A–C)/(B–C) is more than 0.6, the affinity between (B) the compound having the anionic part within the molecule thereof and the ion association of the ionomer resin becomes too strong, and (B) the compound having the anionic part within the molecule thereof is taken in the ion association. As a result, it becomes difficult to disperse the ion association finely and inhibit the crystallization of ethylene chains. On the other hand, if the value of (A–C)/(B–C) is less than 0.3, the affinity between (B) the compound having the anionic part within the molecule thereof and the ion association of the ionomer resin becomes too weak, and (B) the compound having the anionic part within the molecule thereof is not present near the ion association. As a result, it becomes difficult to disperse the ion association finely and inhibit the crystallization of ethylene chains.

The present invention further provides a golf ball comprising a constituent member formed from the above golf ball resin composition. Examples thereof include, for example, a golf ball comprising a core composed at least one layer and a cover covering the core, wherein at least one layer of the core is formed from the golf ball resin composition, or a one-piece golf ball comprising a golf ball body formed from the golf ball resin composition.

The present invention provides a soft golf ball resin composition excellent in resilience. The golf ball using the golf ball resin composition of the present invention is excellent in a shot feeling and resilience.

DESCRIPTION OF THE PREFERRED EMBODIMENT

Figure 1:
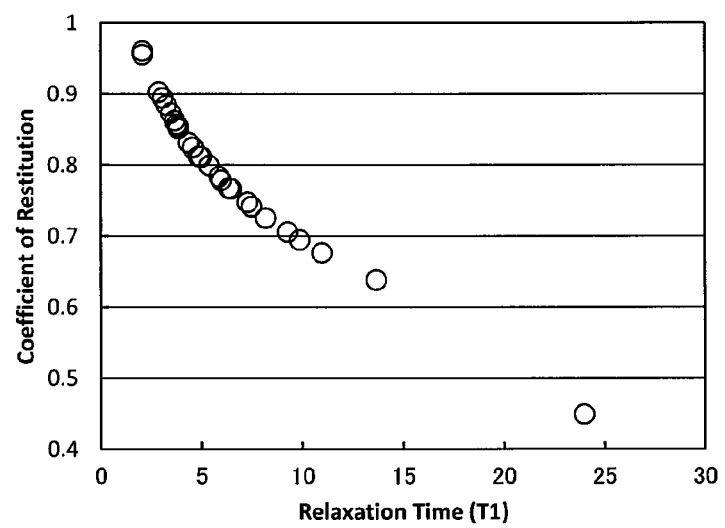
FIG. 1 is a graph showing a relation between coefficient of restitution and the spin-lattice relaxation time (T1) of $^{13}C$ nucleus measured by a high resolution solid state carbon nuclear magnetic resonance (NMR) method.

The present invention provides a golf ball resin composition comprising (A) at least one resin component selected from the group consisting of (a-1) a binary copolymer composed of an olefin and an $\alpha,\beta$-unsaturated carboxylic acid having 3 to 8 carbon atoms, (a-2) an ionomer resin consisting of a metal ion-neutralized product of a binary copolymer composed of an olefin and an $\alpha,\beta$-unsaturated carboxylic acid having 3 to 8 carbon atoms, (a-3) a ternary copolymer composed of an olefin, an $\alpha,\beta$-unsaturated carboxylic acid having 3 to 8 carbon atoms and an $\alpha,\beta$-unsaturated carboxylic acid ester, and (a-4) an ionomer resin consisting of a metal ion-neutralized product of a ternary copolymer composed of an olefin, an $\alpha,\beta$-unsaturated carboxylic acid having 3 to 8 carbon atoms and an $\alpha,\beta$-unsaturated carboxylic acid ester, and (B) a compound having an anionic part within a molecule thereof, provided that the golf ball resin composition further contains (C) a basic inorganic metal compound in the case of containing only (a-1) the binary copolymer and/or (a-3) the ternary copolymer as (A) the resin component, wherein with respect to a metal ion contained in the golf ball resin composition, (A) the resin component and (B) the compound having the anionic part within the molecule thereof, following coordinate energies obtained by ab initio molecular orbital calculation method using a basis function B3LYP/6-31G(d) satisfy a following expression: $0.3 \leq (A-C)/(B-C) \leq 0.6$.

Coordinate energy A (kcal/mol): coordinate energy between the metal ion and the anionic part of (B) component,
Coordinate energy B (kcal/mol): coordinate energy between the metal ion and the carboxyl ion of (A) component,
Coordinate energy C (kcal/mol): coordinate energy between the metal ion and the olefin of (A) component.

First, (A) at least one resin component selected from the group consisting of (a-1) a binary copolymer composed of an olefin and an $\alpha,\beta$-unsaturated carboxylic acid having 3 to 8 carbon atoms, (a-2) an ionomer resin consisting of a metal ion-neutralized product of a binary copolymer composed of an olefin and an $\alpha,\beta$-unsaturated carboxylic acid having 3 to 8 carbon atoms, (a-3) a ternary copolymer composed of an olefin, an $\alpha,\beta$-unsaturated carboxylic acid having 3 to 8 carbon atoms and an $\alpha,\beta$-unsaturated carboxylic acid ester, and (a-4) an ionomer resin consisting of a metal ion-neutralized product of a ternary copolymer composed of an olefin, an $\alpha,\beta$-unsaturated carboxylic acid having 3 to 8 carbon atoms and an $\alpha,\beta$-unsaturated carboxylic acid ester will be explained.

(a-1) component is a nonionic binary copolymer composed of an olefin and an $\alpha,\beta$-unsaturated carboxylic acid having 3 to 8 carbon atoms wherein the carboxyl groups thereof are not neutralized. Further, (a-2) component includes an ionomer resin prepared by neutralizing at least a part of carboxyl groups in the binary copolymer composed of an olefin and $\alpha,\beta$-unsaturated carboxylic acid having 3 to 8 carbon atoms with a metal ion.

(a-3) component is a nonionic ternary copolymer composed of an olefin, an $\alpha,\beta$-unsaturated carboxylic acid having 3 to 8 carbon atoms, and an $\alpha,\beta$-unsaturated carboxylic acid ester wherein the carboxyl groups thereof are not neutralized. (a-4) component includes an ionomer resin prepared by neutralizing at least a part of carboxyl groups in the ternary copolymer composed of an olefin and an $\alpha,\beta$-unsaturated carboxylic acid having 3 to 8 carbon atoms, and an $\alpha,\beta$-unsaturated carboxylic acid ester with a metal ion.

In the present invention, "(a-1) the binary copolymer composed of an olefin and an $\alpha,\beta$-unsaturated carboxylic acid having 3 to 8 carbon atoms" is sometimes merely referred to as "binary copolymer". "(a-2) The ionomer resin consisting of a metal ion-neutralized product of a binary copolymer composed of an olefin and an $\alpha,\beta$-unsaturated carboxylic acid having 3 to 8 carbon atoms" is sometimes merely referred to as "the binary ionomer resin". "(a-3) The ternary copolymer composed of an olefin, an $\alpha,\beta$-unsaturated carboxylic acid having 3 to 8 carbon atoms, and an $\alpha,\beta$-unsaturated carboxylic acid ester" is sometimes merely referred to as "ternary copolymer". "(a-4) The ionomer resin consisting of a metal ion-neutralized product of a ternary copolymer composed of an olefin, an $\alpha,\beta$-unsaturated carboxylic acid having 3 to 8 carbon atoms, and an $\alpha,\beta$-unsaturated carboxylic acid ester" is sometimes merely referred to as "the ternary ionomer resin".

The olefin preferably includes an olefin having 2 to 8 carbon atoms. Examples of the olefin are ethylene, propylene, butene, pentene, hexene, heptene, and octene. The olefin more preferably includes ethylene. Examples of the $\alpha,\beta$-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the $\alpha,\beta$-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable.

(a-1) The binary copolymer preferably includes a binary copolymer composed of ethylene and (meth)acrylic acid. (a-2) The binary ionomer resin preferably includes the metal ion-neutralized product of the binary copolymer composed of ethylene-(meth)acrylic acid. (a-3) The ternary copolymer preferably includes a ternary copolymer composed of ethylene, (meth)acrylic acid, and (meth)acrylic acid ester. (a-4) The ternary ionomer resin preferably includes the metal ion-neutralized product of the ternary copolymer composed of ethylene, (meth)acrylic acid, and (meth)acrylic acid ester. Herein, (meth)acrylic acid means acrylic acid and/or methacrylic acid.

The content of the $\alpha,\beta$-unsaturated carboxylic acid component having 3 to 8 carbon atoms in (a-1) the binary copolymer or (a-3) the ternary copolymer is preferably 4 mass % or more, more preferably 5 mass % or more, and is preferably 30 mass % or less, more preferably 25 mass % or less.

The melt flow rate (190° C., 2.16 kg) of (a-1) the binary copolymer or (a-3) the ternary copolymer is preferably 5 g/10 min or more, more preferably 10 g/10 min or more, and even more preferably 15 g/10 min or more, and is preferably 1,700 g/10 min or less, more preferably 1,500 g/10 min or less, even more preferably 1,300 g/10 min or less. If the melt flow rate (190° C., 2.16 kg) of (a-1) the binary copolymer or (a-3) the ternary copolymer is 5 g/10 min or more, the golf ball resin composition has better fluidity, and thus it is easier to mold a constituent member. If the melt flow rate (190° C., 2.16 kg) of (a-1) the binary copolymer or (a-3) the ternary copolymer is 1,700 g/10 min or less, the resultant golf ball has better durability.

Specific examples of (a-1) the binary copolymer include an ethylene-methacrylic acid copolymer such as "NUCREL (registered trademark) (e.g. NUCREL N1050H, NUCREL N2050H, NUCREL N1110H, NUCREL N0200H) manufactured by Du Pont-Mitsui Polychemicals Co, and an ethylene-acrylic acid copolymer such as "PRIMACORE (registered trademark) 5980I" available from Dow Chemical Company.

Specific examples of (a-3) the ternary copolymer include "NUCREL (registered trademark) (e.g. NUCREL AN4318, NUCREL AN4319) manufactured by Du Pont-Mitsui Polychemicals Co, and "NUCREL (registered trademark) (e.g. NUCREL AE) manufactured by E.I. du Pont de Nemours and Company, and "PRIMACORE (registered trademark) (e.g. PRIMCOR AT310, PRIMCOR AT320) available from Dow Chemical Company. (a-1) The binary copolymer or (a-3) the ternary copolymer may be used alone or as a mixture of at least two of them.

The content of the $\alpha,\beta$-unsaturated carboxylic acid component having 3 to 8 carbon atoms of (a-2) the binary ionomer resin is preferably 15 mass % or more, more preferably 16 mass % or more, and even more preferably 17 mass % or more, and is preferably 30 mass % or less, more preferably 25 mass % or less. If the content of the $\alpha,\beta$-unsaturated carboxylic acid component having 3 to 8 carbon atoms is 15 mass % or more, the resultant constituent member has a desirable hardness. If the content of the $\alpha,\beta$-unsaturated carboxylic acid component having 3 to 8 carbon atoms is 30 mass % or less, since the hardness of the resultant constituent member does not become excessively high, the durability and shot feeling become better.

The degree of neutralization of the carboxyl groups contained in (a-2) the binary ionomer resin is preferably 15 mole % or more, more preferably 20 mole % or more, and is preferably 90 mole % or less, more preferably 85 mole % or less. If the degree of neutralization is 15 mole % or more, the resilience and durability of the obtained golf ball become better. On the other hand, if the degree of neutralization is 90 mole % or less, the fluidity of the golf ball resin composition becomes better (resulting in good moldability). It is noted that the degree of neutralization of the carboxyl groups in (a-2) the binary ionomer resin can be calculated by the following expression.

Degree of neutralization (mol %) in the binary ionomer resin=(the number of moles of carboxyl groups neutralized in the binary ionomer resin/ the number of moles of all carboxyl groups contained in the binary ionomer resin)×100

Examples of a metal ion used for neutralizing at least a part of carboxyl groups of (a-2) the binary ionomer resin include: monovalent metal ions such as sodium, potassium, lithium, or the like; divalent metals ions such as magnesium, calcium, zinc, barium, cadmium, or the like; trivalent metals ions such as aluminum or the like; and other metals ions such as tin, zirconium, or the like.

Specific examples of (a-2) the binary ionomer resin include trade name "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7329 (Zn))" commercially available from Du Pont-Mitsui Polychemicals Co., Ltd.

Further, examples include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" commercially available from E.I. du Pont de Nemours and Company.

Further, examples include "Iotek (registered trademark) (e.g. Iotek 8000 (Na), Iotek 8030 (Na), Iotek 7010 (Zn), Iotek 7030 (Zn))" commercially available from ExxonMobil Chemical Corporation.

(a-2) The binary ionomer resins may be used alone or as a mixture of at least two of them. It is noted that Na, Zn, Li, and Mg described in the parentheses after the trade names indicate metal types of neutralizing metal ions of the binary ionomer resins.

(a-2) The binary ionomer resin preferably has a bending stiffness of 140 MPa or more, more preferably 150 MPa or more, and even more preferably 160 MPa or more, and preferably has a bending stiffness of 550 MPa or less, more preferably 500 MPa or less, even more preferably 450 MPa or less. If the bending stiffness of (a-2) the binary ionomer resin is too low, the flight distance tends to be shorter because of the increased spin rate of the golf ball. If the bending stiffness is too high, the durability of the golf ball may be lowered.

(a-2) The binary ionomer resin preferably has the melt flow rate (190° C., 2.16 kg) of 0.1 g/10 min or more, more preferably 0.5 g/10 min or more, and even more preferably 1.0 g/10 min or more, and preferably has the melt flow rate (190° C., 2.16 kg) of 30 g/10 min or less, more preferably 20 g/10 min or less, and even more preferably 15 g/10 min or less. If the melt flow rate (190° C., 2.16 kg) of (a-2) the binary ionomer resin is 0.1 g/10 min or more, the golf ball resin composition has better fluidity and thus it is easy to mold the thin layer. If the melt flow rate (190° C., 2.16 kg) of (a-2) the binary ionomer resin is 30 g/10 min or less, the durability of the resultant golf ball becomes better.

(a-2) The binary ionomer resin preferably has a slab hardness of 50 or more, more preferably 55 or more, even more preferably 60 or more, and preferably has a slab hardness of 75 or less, more preferably 73 or less, even more preferably 70 or less in Shore D hardness. If the binary ionomer resin has a slab hardness of 50 or more in Shore D hardness, the resultant constituent member has a high hardness. If the binary ionomer resin has a slab hardness of 75 or less in Shore D hardness, the resultant constituent member does not become excessively hard and thus the obtained golf ball has better durability.

The content of the $\alpha,\beta$-unsaturated carboxylic acid component having 3 to 8 carbon atoms in (a-4) the ternary ionomer resin is preferably 2 mass % or more, more preferably 3 mass % or more, and is preferably 30 mass % or less, more preferably 25 mass % or less.

The degree of neutralization of the carboxyl groups contained in (a-4) the ternary ionomer resin is preferably 20 mole % or more, more preferably 30 mole % or more, and is preferably 90 mole % or less, more preferably 85 mole % or less. If the degree of neutralization is 20 mole % or more, the resilience and durability of the obtained golf ball using the golf ball resin composition become better. On the other hand, if the degree of neutralization is 90 mole % or less, the fluidity of the golf ball resin composition becomes better (resulting in good moldability). It is noted that the degree of neutralization of the carboxylic groups in ionomer resin can be calculated by the following expression.

Degree of neutralization (mole %) in the ionomer resin=(the number of moles of carboxyl groups neutralized in the ionomer resin/the number of moles of all carboxyl groups contained in the ionomer resin)×100

Examples of a metal ion used for neutralizing at least a part of carboxyl groups of (a-4) the ternary ionomer resin include: monovalent metal ions such as sodium, potassium, lithium, or the like; divalent metals ions such as magnesium, calcium, zinc, barium, cadmium, or the like; trivalent metals ions such as aluminum or the like; and other metals ions such as tin, zirconium, or the like.

Specific examples of (a-4) the ternary ionomer resin include trade name "Himilan (registered trademark) (e.g. Himilan AM7327 (Zn), Himilan 1855 (Zn), Himilan 1856 (Na), Himilan AM7331 (Na), or the like)" commercially available from Du Pont-Mitsui Polychemicals Co., Ltd. Further, the ternary ionomer resins commercially available from E.I. du Pont de Nemours and Company include trade name "Surlyn (registered trademark) (e.g. Surlyn 6320 (Mg), Surlyn 8120 (Na), Surlyn 8320 (Na), Surlyn 9320 (Zn), Surlyn 9320W (Zn) or the like)". The ionomer resins commercially available from ExxonMobil Chemical Corporation include trade name "Iotek (registered trademark) (e.g. Iotek 7510 (Zn), Iotek 7520 (Zn) or the like)". It is noted that Na, Zn, Li, and Mg described in the parentheses after the trade names indicate metal types of neutralizing metal ions. (a-4) The ternary ionomer resins may be used alone or as a mixture of at least two of them.

(a-4) The ternary ionomer resin preferably has a bending stiffness of 10 MPa or more, more preferably 11 MPa or more, even more preferably 12 MPa or more, and preferably has a bending stiffness of 100 MPa or less, more preferably 97 MPa or less, even more preferably 95 MPa or less. If the bending stiffness of (a-4) the ternary ionomer resin is too low, the flight distance tends to be shorter because of the increased spin rate of the golf ball. If the bending stiffness is too high, the durability of the golf ball may be lowered.

(a-4) The ternary ionomer resin preferably has the melt flow rate (190° C., 2.16 kg) of 0.1 g/10 min or more, more preferably 0.3 g/10 min or more, and even more preferably 0.5 g/10 min or more, and preferably has the melt flow rate (190° C., 2.16 kg) of 20 g/10 min or less, more preferably 15 g/10 min or less, even more preferably 10 g/10 min or less. If the melt flow rate (190° C., 2.16 kg) of (a-4) the ternary ionomer resin is 0.1 g/10 min or more, the golf ball resin composition has better fluidity and thus it is easy to mold a thin layer. If the melt flow rate (190° C., 2.16 kg) of (a-4) the ternary ionomer resin is 20 g/10 min or less, the durability of the resultant golf ball becomes better.

(a-4) The ternary ionomer resin preferably has a slab hardness of 20 or more, more preferably 25 or more, even more preferably 30 or more, and preferably has a slab hardness of 70 or less, more preferably 65 or less, even more preferably 60 or less in Shore D hardness. If the ternary ionomer resin has a slab hardness of 20 or more in Shore D hardness, the resultant constituent member does not become excessively soft and thus the golf ball has higher resilience. If the ternary ionomer resin has a slab hardness of 70 or less in Shore D hardness, the resultant constituent member does not become excessively hard and thus the golf ball has better durability.

The golf ball resin composition of the present invention preferably contains, as (A) the resin component, (a-3) the ternary copolymer or (a-4) the ternary ionomer resin. This is because the obtained constituent member does not become too hard and the resilience thereof increases.

Next, (B) the compound having the anionic part within the molecule thereof is described. Examples of the anionic part include an anionic group generated by neutralizing an acid functional group such as a carboxyl group, sulfonic acid group, sulfuric acid group, phosphoric acid group, phosphonic acid group, and the like.

As (B) the compound having the anionic part within the molecule thereof, an anionic surfactant is preferred, and an anionic surfactant containing sulfur is more preferred. There is no particular limitation on the anionic surfactant containing sulfur, as long as the anionic surfactant containing sulfur has an anion or a functional group forming an anion and a sulfur atom in a molecule thereof, and has an action of lowering surface tension when being dissolved in water. It is conceivable that (B) the anionic surfactant containing sulfur is present near an ion association of the ionomer resin (I) to finely disperse the ion association and inhibit crystallization of ethylene chains, and (II) to weaken constraining of main chains by the ion association. With these actions, the mobility of molecular chains in the golf ball resin composition of the present invention increases, and the resilience increases while maintaining the flexibility thereof.

(B) The anionic surfactant containing sulfur, for example, preferably includes an anionic surfactant having an S=O bond, and more preferably includes an anionic surfactant such as a sulfate (salt of sulfuric acid), sulfonate (salt of sulfonic acid), or the like. Specific examples of (B) the anionic surfactant containing sulfur include ester sulfates such as alkyl ester sulfate, polyoxyethylene polycyclic phenyl ether sulfate, polyoxyethylene alkyl ether sulfate, polyoxyethylene aryl ether sulfate, and polyoxyethylene castor-oil ether sulfate; and sulfonic acids and/or salts thereof such as an alkylbenzene sulfonic acid and/or a salt thereof, an alkylene disulfonic acid and/or a salt thereof, a monoalkylsulfosuccinic acid and/or a salt thereof, a dialkylsulfosuccinic acid and/or a salt thereof, an alkyldiphenyl ether disulfonic acid and/or a salt thereof, an alkane sulfonic acid and/or a salt thereof, and salts of naphthalenesulfonic acid formalin condensate.

The sulfate or sulfonate includes: salts of alkali metals such as sodium, potassium, or the like; salts of divalent metals such as magnesium, calcium, or the like; and ammonium salts such as ammonia, triethanolamine, or the like. Although the anionic surfactant containing sulfur used in the present invention preferably includes a salt which is neutralized, the anionic surfactant containing sulfur may be a free acid such as a sulfonic acid, which can be easily dissociated to form an anion.

The alkyl sulfate includes, for example, sodium lauryl sulfate, higher alcohol sodium sulfate, triethanolamine lauryl sulfate, and ammonium lauryl sulfate. The polyoxyethylene alkyl ether sulfate includes, for example, sodium lauryl polyoxyethylene ether sulfate, sodium polyoxyethylene alkyl ether sulfate, and triethanolamine polyoxyethylene alkyl ether sulfate. The alkylbenzene sulfonic acid and/or a salt thereof includes dodecylbenzene sulfonic acid, sodium dodecylbenzene sulfonate, and the like.

In the present invention, a dialkylsulfosuccinic acid and/or a salt thereof is preferably used as the anionic surfactant containing sulfur. The carbon number of the alkyl group of the dialkylsulfosuccinic acid and/or the salt thereof is preferably 3 or larger, and more preferably 5 or larger, and is preferably 30 or smaller, and more preferably 28 or smaller. If the carbon number of the alkyl group is within the above described range, the mobility of a molecular chain increases, and the resilience of the composition increases while maintaining the flexibility thereof. Furthermore, two of the alkyl groups may be identical or may be different from each other. The dialkylsulfosuccinic acid and/or the salt thereof includes for example, di(2-ethylhexyl)sulfosuccinic acid, sodium di(2-ethylhexyl)sulfosuccinate, magnesium di(2-ethylhexyl)sulfosuccinate, or the like.

(B) The compound having the anionic part within the molecule thereof preferably further contains a cationic part and a hydrocarbon chain. There is no limitation on the above compound, as long as the compound has any hydrocarbon chain that may have a substituent group such as a hydroxyl group; a cationic part; and an anionic part. Particularly, an amphoteric surfactant is suitably used. Since the amphoteric surfactant has a cationic part and an anionic part within a molecule thereof, it can enhance the resilience of the golf ball resin composition effectively without using a metal ion of the ionomer resin component. Further, the amphoteric surfactant has electric charge of plus and minus so that the affinity for the ion association of the ionomer resin becomes appropriate, and the amphoteric surfactant can be present near the ion association.

The amphoteric surfactant is a surfactant having a cationic part and anionic part within a molecule thereof, and examples thereof include a betaine type amphoteric surfactant such as alkylbetaine type, amidobetaine type, imidazoliumbetaine type, alkylsulfobetain type, amidosulfobetain type, and the like; amidoamino acid type amphoteric surfactant and alkylamino fatty acid salt; alkylamine oxide; β-alanine type amphoteric surfactant and glycine type amphoteric surfactant; sulfobetaine type amphoteric surfactant; phosphobetaine type amphoteric surfactant; and the like.

The alkylbetaine type amphoteric surfactant includes a compound represented by the following formula (1).

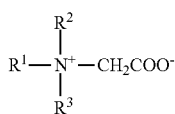
(1)

($R^1$ represents an alkyl group having 8 to 30 carbon atoms or alkenyl group having 8 to 30 carbon atoms. $R^2$ and $R^3$ may be identical or different, and represent an alkyl group having 1 to 5 carbon atoms or a hydroxyalkyl group having 1 to 5 carbon atoms.)

The amidobetaine type amphoteric surfactant includes a compound represented by the following formula (2).

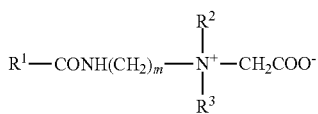
(2)

($R^1$ represents an alkyl group having 8 to 30 carbon atoms or alkenyl group having 8 to 30 carbon atoms. $R^2$ and $R^3$ may be identical or different, and represent an alkyl group having 1 to 5 carbon atoms or a hydroxyalkyl group having 1 to 5 carbon atoms. m represents an integer of 1 to 5.)

The imidazoliumbetaine type amphoteric surfactant includes a compound represented by the following formula (3).

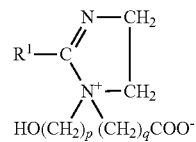
(3)

($R^1$ represents an alkyl group having 8 to 30 carbon atoms or alkenyl group having 8 to 30 carbon atoms. p and q may be identical or different, and represent an integer of 1 to 5.)

The alkylsulfobetaine type amphoteric surfactant includes a compound represented by the following formula (4).

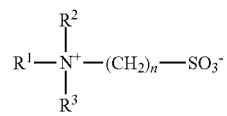
(4)

($R^1$ represents an alkyl group having 8 to 30 carbon atoms or alkenyl group having 8 to 30 carbon atoms. $R^2$ and $R^3$ may be identical or different, and represent an alkyl group having 1 to 5 carbon atoms or a hydroxyalkyl group having 1 to 5 carbon atoms. n represents an integer of 1 to 5.)

The amidoamino acid type amphoteric surfactant includes a compound represented by the following formula (5).

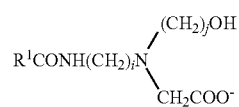
(5)

($R^1$ represents an alkyl group having 8 to 30 carbon atoms or alkenyl group having 8 to 30 carbon atoms. i and j may be identical or different, and represent an integer of 1 to 5.)

The alkylamine oxide includes a compound represented by the flowing formula (6).

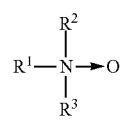
(6)

($R^1$ represents an alkyl group having 8 to 30 carbon atoms or alkenyl group having 8 to 30 carbon atoms. $R^2$ and $R^3$ may be identical or different, and represent an alkyl group having 1 to 5 carbon atoms or a hydroxyalkyl group having 1 to 5 carbon atoms).

In the formulae (1) to (6), $R^1$ to $R^3$ may be a straight or branched chain. It is preferred that at least one of $R^1$ to $R^3$ has 12 to 18 carbon atoms. m, p, q, n, i, and j are preferably in a range of 1 to 3.

Examples of $R^1$ include an alkyl group such as an octyl group, nonyl group, decyl group, undecyl group, dodecyl group, tridecyl group, tetradecyl group, pentadecyl group, hexadecyl group, heptadecyl group, octadecyl group, isooctadecyl group, nonadecyl group, eicocyl group and the like; an alkenyl group such as tetradecenyl group, hexadecenyl group, octadecenyl group, isooctadecenyl group, eicosenyl group and the like; an mixed alkyl group, which is a mixture of those; such as a coconut oil alkyl group, a palm kernel oil alkyl group, and a beef tallow alkyl group; and the like. Examples of $R^2$ and $R^3$ include a methyl group, ethyl group, hydroxymethyl group, hydroxyethyl group and the like.

Specific examples of the amphoteric surfactant are dimethyllaurylbetaine, dimethyloleylbetaine, dimethylstearylbetaine, stearyldihydroxymethylbetaine, stearyldihydroxyethylbetaine, lauryldihydroxymethylbetaine, lauryldihydroxyethylbetaine, myristyldihydroxymethylbetaine, behenyldihydroxymethylbetaine, palmityldihydroxyethylbetaine, oleyldihydroxymethylbetaine, coconut oil fatty acid amidopropylbetaine, lauric acid amidoalkylbetaine, 2-alkyl-N-carboxyalkylimidazoliumbetaine, lauric acid amidoalkylhydroxysulfobetaine, coconut oil fatty acid amidodialkylhydroxyalkylsulfobetaine, N-alkyl-β-aminopropionic acid salt, N-alkyl-β-iminodipropionic acid salt, alkyldiaminoalkylglycine, alkylpolyaminoalkylglycine, sodium salt of alkylamino fatty acid, N,N-dimethylstearylamine oxide, and the like.

Among them, from the aspect of striking a balance between resilience and flexibility, the betaine type amphoteric surfactant is preferred, and the alkylbetaine type amphoteric surfactant represented by the formula (1) is more preferred.

The content of (B) the compound having the anionic part within the molecule thereof is preferably 1 part by mass or more, more preferably 3 parts by mass or more, even more preferably 10 parts by mass or more, and is preferably 200 parts by mass or less, more preferably 150 parts by mass or less, even more preferably 100 parts by mass or less with respect to 100 parts by mass of (A) the resin component. If the content of (B) the compound having the anionic part within the molecule thereof falls within the above range, the resilience increases while maintaining the flexibility thereof.

The golf ball resin composition of the present invention may further contain (C) a basic inorganic metal compound. (C) The basic inorganic metal compound neutralizes an unneutralized carboxyl group of (A) the resin component. When the golf ball resin composition of the present invention contains only (a-1) the binary copolymer and/or (a-3) the ternary copolymer as (A) the resin component, the golf ball resin composition of the present invention contains (C) the basic inorganic metal compound as an essential component. (C) The basic inorganic metal compound includes, for example, elemental metals such as sodium, lithium, potassium, calcium, and magnesium; metal hydroxides such as magnesium hydroxide, calcium hydroxide, sodium hydroxide, lithium hydroxide, potassium hydroxide, and copper hydroxide; metal oxides such as magnesium oxide, calcium oxide, zinc oxide, and copper oxide; and metal carbonates such as magnesium carbonate, calcium carbonate, sodium carbonate, lithium carbonate, and potassium carbonate. (C) The basic inorganic metal compound may be used alone or in combination of two or more of them. Among those, magnesium hydroxide, calcium hydroxide, sodium carbonate, lithium carbonate, potassium carbonate, zinc oxide, or copper oxide is preferable as (C) the basic inorganic metal compound.

The content of (C) the basic inorganic metal compound is preferably more than 0 part by mass, and more preferably 1 part by mass or more, and is preferably 200 parts by mass or less, and more preferably 70 parts by mass or less with respect to 100 parts by mass of (A) the resin component. If the content of (C) the basic inorganic metal compound is too small, the amount of the ion association becomes small and the resilience of the composition becomes low. On the other hand, if the content is too large, there may be cases where the ion association does not disperse finely and the resilience of the composition becomes low.

The total neutralization degree in the golf ball resin composition of the present invention is preferably 53 mole % or higher, more preferably 60 mole % or higher, even more preferably 80 mole % or higher, and is preferably 1,000 mole % or lower, more preferably 700 mole % or lower, and even more preferably 400 mole % or lower. If the total neutralization degree is 53 mole % or higher, the amount of ion associations becomes large and the resilience of the composition becomes high, while if the total neutralization degree is 1,000 mole % or lower, (C) the basic inorganic metal compound disperses homogenously and the durability of the composition improves. The total neutralization degree is defined by the expression below.

Total Neutralization Degree (mole %)=100×[number of moles of a cation component in (A) the resin component×valence of the cation component+number of moles of a cation-forming group or a cation component in (B) the compound having the anionic part within the molecule thereof× valence of the cation-forming group or the cation component+number of moles of a metal component in (C) the basic inorganic metal compound× valence of the metal component]/[number of moles of the carboxyl group in (A) the resin component+number of moles of an anion-forming group in (B) the compound having the anionic part with the molecule thereof×valence of the anion-forming group]

The golf ball resin composition of the present invention may further contain other thermoplastic elastomers as a resin component, as long as they do not impair the effect of the present invention. When containing other thermoplastic elastomers, the content of other thermoplastic elastomers in the resin component is preferably 50 mass % or less, more preferably 25 mass % or less, and even more preferably 10 mass % or less.

Specific examples of other thermoplastic elastomers are a thermoplastic polyamide elastomer having a commercial name of "Pebax (e.g. "Pebax 2533")" commercially available from Arkema K. K.; a thermoplastic polyurethane elastomer having a commercial name of "Elastollan (e.g. "Elastollan XNY85A")" commercially available from BASF Japan Ltd; a thermoplastic polyester elastomer having a commercial name of "Hytrel (e.g. "Hytrel 3548", "Hytrel 4047")" commercially available from Du Pont-Toray Co., Ltd.; a thermoplastic styrene elastomer having a commercial name of "Rabalon (e.g. "Rabalon T3221C")" commercially available from Mitsubishi Chemical Corporation; and the like.

In the present invention, the golf ball resin composition may further contain a pigment component such as a white pigment (for example, titanium oxide) and a blue pigment, a weight adjusting agent, a dispersant, an antioxidant, an ultraviolet absorber, a light stabilizer, a fluorescent material, a fluorescent brightener, and the like, as long as they do not impair the effect of the present invention. In addition, the golf ball resin composition of the present invention may further contain a fatty acid and/or a metal salt thereof as a fluidity modifier, but it is not preferable that the fatty acid and/or the metal salt thereof is used in combination, because they cause to lower the mechanical properties.

The amount of the white pigment (for example, titanium oxide) is preferably 0.5 part or more, more preferably 1 part or more, and is preferably 10 parts or less, more preferably 8 parts or less, with respect to 100 parts of the resin component by mass. If the amount of the white pigment is 0.5 part by mass or more, it is possible to impart the opacity to the resultant golf ball constituent member. Further, if the amount of the white pigment is more than 10 parts by mass, the durability of the resultant golf ball may deteriorate.

The golf ball resin composition of the present invention can be obtained, for example, by dry blending (A) component, (B) component, and where necessary (C) component. Further, the dry blend mixture may be extruded in the form of a pellet. The dry blending may be carried out using, for example, a mixer capable of blending raw materials in the form of the pellet, more preferably a tumbler type mixer. Extruding can be carried out by publicly known extruders such as a single-screw kneading extruder, a twin-screw kneading extruder, and a twin-single screw kneading extruder.

In the present invention, with respect to a metal ion contained in the golf ball resin composition of the present invention, (A) the resin component and (B) the compound having the anionic part within the molecule thereof, following coordinate energies obtained by ab initio molecular orbital calculation method using a basis function B3LYP/6-31G(d) satisfy a following expression: $0.3 \leq (A-C)/(B-C) \leq 0.6$.
Coordinate energy A (kcal/mol): coordinate energy between the metal ion and the anionic part of (B) component,
Coordinate energy B (kcal/mol): coordinate energy between the metal ion and the carboxyl ion of (A) component,
Coordinate energy C (kcal/mol): coordinate energy between the metal ion and the olefin of (A) component.

Herein, the metal ion contained in the golf ball resin composition means a metal ion derived from all of (A) the resin component, (B) the compound having the anionic part within the molecule thereof, and (C) the basic inorganic metal compound. The coordinate energies A, B, and C are preferably calculated using a high version program such as ab initio molecular orbital calculation program Gaussian 03, and Gaussian 09, and the like.

$(A-C)/(B-C)$ is an index representing a ratio of a strength in which the metal ion coordinates the anionic part in (B) component to a strength in which the metal ion coordinates the carboxyl ion in (A) component. In the present invention, the absolute values of the coordinate energies A, B, and C may vary with the kinds of the metal ion, so the ratio of the difference of the coordinate energies $(A-C)/(B-C)$ is employed. By employing the ratio $(A-C)/(B-C)$, the same tendency is recognized regardless of the kinds the metal ion. In the present invention, the value of $(A-C)/(B-C)$ is preferably 0.3 or more, more preferably 0.35 or more, and is preferably 0.6 or less, more preferably 0.55 or less. If the value of $(A-C)/(B-C)$ falls within the above range, (B) the compound having the anionic part within the molecule thereof has an appropriate affinity for the ion association of (A) the resin component and thereby being present near the ion association of (A) the resin component. As a result, it is conceivable that (B) the compound having the anionic part within the molecule thereof (I) finely disperses the ion association and inhibits crystallization of ethylene chains, and (II) weakens constraining of main chains by the ion association. With these actions, the mobility of a molecular chain of the ionomer resin increases, and the resilience of the composition increases while maintaining the flexibility thereof.

The golf ball resin composition of the present invention preferably has a spin-lattice relaxation time (T1) of $^{13}C$ nucleus measured by a high resolution solid state carbon nuclear magnetic resonance (NMR) method of 15 seconds or shorter, more preferably 12 seconds or shorter, even more preferably 10 seconds or shorter, and most preferably 8 seconds or shorter. When the decay of the magnetization was measured by the spin-lattice relaxation time (T1) of $^{13}C$ nucleus measured by a high resolution solid state carbon nuclear magnetic resonance (NMR) method on ionomer resins, the obtained relaxation time (T1) is thought to be caused by trans conformation of ethylene chains. The present inventors predicted that ethylene crystals and ethylene chain-constraining layers surrounding the ion association exist as a part where the trans conformation can possibly occur, and that a relaxation component in measurement of magnetization decay can be separated into a short-time component and a long-time component. Then, the present inventors have found that the ethylene chain-constraining layers correlate with resilience. More specifically, when the relaxation time (T1) becomes shorter, the mobility of the ethylene chain-constraining layers becomes higher and the resilience improves. Further, if the mobility of the molecular chain is enhanced, the increase in the flexibility is expected. Thus, the golf ball resin composition of the present invention preferably has a spin-lattice relaxation time (T1) of $^{13}C$ nucleus measured by a high resolution solid state carbon nuclear magnetic resonance (NMR) method of such short time.

Furthermore, with regard to the golf ball resin composition of the present invention, when measurement is conducted by using a dynamic viscoelasticity device in a tensile mode with a condition of oscillation frequency of 10 Hz, temperature of 12° C., and measurement strain of 0.05%, the storage modulus E' (Pa) and the loss modulus E'' (Pa) preferably satisfy the formula below. By satisfying the formula below, the golf ball resin composition will have a high resilience while maintaining the flexibility at a high level. It should be noted that log in the formula below is common logarithm.

$$\log(E'/E''^2) \geq -6.55$$

It is thought that the resilience of the composition becomes higher as the storage modulus E' (Pa) becomes larger, or as the loss modulus E'' (Pa) becomes smaller. In addition, hardness also increases as the storage modulus E' (Pa) becomes larger. In the above described formula, since the denominator is the second power of the loss modulus E'' whereas the numerator is the first power of the storage elastic modulus E', the above described formula means that reducing the loss modulus E'' has a larger improvement effect on the resilience than increasing the storage modulus E' to enhance the hardness.

$\log(E'/E''^2)$ is preferably −6.23 or more, more preferably −6.02 or more, and even more preferably −5.89 or more. Further, $\log(E'/E''^2)$ is, but not limited to, preferably −5.24 or less, more preferably −5.40 or less, because when the $\log(E/E''^2)$ is −5.24, the coefficient of Restitution almost reaches the maximum value of 1. The reasons of employing the measurement conditions of the oscillation frequency: 10 Hz, the temperature: 12° C. as the conditions of measuring the dynamic viscoelasticity are follows. The contact time between the golf ball and a collision bar (cylindrical metallic material) is 500 micro seconds in measuring coefficient of restitution at 40 m/s. If this is considered as a deformation of one cycle, this deformation corresponds to a deformation at the several thousands Hertz. Based on the frequency and temperature superposition principle of the general ionomer resin, the dynamic viscoelasticity measured at the conditions of temperature: room temperature and oscillation frequency: several thousands Hertz corresponds to the dynamic viscoelasticity measured at the conditions of temperature: 12° C. and oscillation frequency: 10 Hz.

The golf ball resin composition of the present invention preferably has the melt flow rate (190° C., 2.16 kg) of 0.01 g/10 min or more, more preferably 0.05 g/10 min or more, and even more preferably 0.1 g/10 min or more, and preferably has the melt flow rate (190° C., 2.16 kg) of 100 g/10 min or less, more preferably 80 g/10 min or less, and even more preferably 50 g/10 min or less. If the golf ball resin composition has the melt flow rate in the above range, the moldability into the golf ball constituent member is good.

The golf ball resin composition of the present invention preferably has a rebound resilience of 40% or more, more preferably 43% or more, even more preferably 46% or more. Use of the golf ball resin composition having a rebound resilience of 40% or more provides the golf ball excellent in the resilience (flying distance). Here, the rebound resilience of the golf ball resin composition is measured by molding the golf ball resin composition into a sheet form. The methods for the measurement are described later.

The golf ball resin composition preferably has a slab hardness of 5 or more, more preferably 7 or more, even more preferably 10 or more, and preferably has a slab hardness of 70 or less, more preferably 65 or less, even more preferably 60 or less, most preferably 50 or less in Shore D hardness. Use of the golf ball resin composition having a slab hardness of 5 or more in Shore D hardness provides the golf ball with excellent resilience (flight distance). On the other hand, use of the golf ball resin composition having a slab hardness of 70 or less in Shore D hardness provides the golf ball with excellent durability. Herein, the slab hardness of the golf ball resin composition is a measured hardness of the golf ball resin composition that is molded into a sheet form by a measuring method described later.

The golf ball of the present invention is not limited, as long as it comprises a constituent member formed from the golf ball resin composition of the present invention. For example, in a one-piece golf ball, in a two-piece golf ball comprising a single-layered core and a cover disposed around the core, in a three-piece golf ball comprising a core having a center and a single-layered intermediate layer disposed around the center, and a cover disposed around the core, and in a multi-piece golf ball comprising a core having a center and at least one intermediate layer disposed around the center, and a cover disposed around the core (including the three-piece golf ball mentioned above), any one of constituent members may be formed from the above golf ball resin composition. In one preferable embodiment of the present invention, the golf ball comprises a core composed of at least one layer and a cover disposed around the core, wherein at least one layer of the core is formed from the golf ball resin composition of the present invention. In another preferable embodiment, the golf ball body of the one-piece golf ball is formed from the golf ball resin composition of the present invention. In particular, in one more preferable embodiment, the two-piece golf ball comprises a single-layered core and a cover disposed around the core, wherein the single-layered core is formed from the golf ball resin composition of the present invention. Also, in another more preferable embodiment, the multi-piece golf ball comprises a core having a center and at least one intermediate layer disposed around the center, and a cover disposed around the core, wherein the center is formed from the golf ball resin composition of the present invention.

In the following, the present invention will be explained based on the two-piece golf ball that comprises a core and a cover disposed around the core, wherein the core is formed from the golf ball resin composition of the present invention. However, the present invention is not limited to this embodiment.

The core, for example, is molded by injection molding the golf ball resin composition of the present invention. Specifically, it is preferred that the golf ball resin composition heated and melted at the temperature ranging from 160° C. to 260° C. is charged into a mold held under the pressure of 1 MPa to 100 MPa for 1 second to 100 seconds, and after cooling for 30 seconds to 300 seconds, the mold is opened.

The core preferably has a spherical shape. If the core does not have a spherical shape, the cover does not have a uniform thickness. As a result, there exist some portions where the performance of the cover is lowered.

The core preferably has the diameter of the 39.00 mm or more, more preferably 39.25 mm or more, and even more preferably 39.50 mm or more, and preferably has the diameter of 42.37 mm or less, more preferably 42.22 mm or less, and even more preferably 42.07 mm or less. If the core has the diameter of 39.00 mm or more, the thickness of the cover does not become too thick and thus the resilience becomes better. On the other hand, if the core has the diameter of 42.37 mm or less, the thickness of the cover does not become too thin, and hence a protection ability of the cover is sufficiently provided.

When the core has a diameter from 39.00 mm to 42.37 mm, a compression deformation amount (shrinking deformation amount of the core along the compression direction) of the core when applying a load from 98 N as an initial load to 1275 N as a final load is preferably 1.00 mm or more, more preferably 1.10 mm or more, and is preferably 5.00 mm or less, more preferably 4.90 mm or less, even more preferably 4.80 mm or less. If the compression deformation amount is 1.00 mm or more, the shot feeling of the golf ball becomes better. If the compression deformation amount is 5.00 mm or less, the resilience of the golf ball becomes better.

The surface hardness of the core is 20 or larger, more preferably 25 or larger, and even more preferably 30 or larger in shore D hardness, and is preferably 70 or smaller, more preferably 69 or smaller in shore D hardness. If the surface hardness is 20 or larger in shore D hardness, the core does not become so soft and the better resilience is obtained. If the surface hardness of the core is 70 or smaller in shore D hardness, the core does not become so hard and the better shot feeling is obtained.

The center hardness of the core is preferably 5 or larger, more preferably 7 or larger, and even more preferably 10 or larger in Shore D hardness. If the center hardness is less than 5 in shore D hardness, the core becomes so soft that the resilience of the golf ball tends to become lower. Further, the center hardness of the core is preferably 50 or smaller, more preferably 48 or smaller, and even more preferably 46 or smaller in Shore D hardness. If the center hardness is more than 50 in shore D hardness, the core becomes too hard, resulting in the poor shot feeling. In the present invention, the center hardness of the core is the hardness measured with the Shore D type spring hardness tester at the central point of a cut plane of a core which has been cut into two halves.

The core preferably contains a filler. The filler is mainly blended as a weight adjusting agent in order to adjust density of the golf ball as the final product within the range of 1.0 to 1.5 g/cm$^3$, and may be blended as required. Examples of the filler include an inorganic filler such as zinc oxide, barium sulfate, calcium carbonate, magnesium oxide, tungsten powder, and molybdenum powder. The amount of the filler to be blended in the resin composition is preferably 0.5 part or more, more preferably 1.0 part or more, and is preferably 30 parts or less, more preferably 20 parts or less with respect to 100 parts by mass of (A) the resin component. If the amount of the filler to be blended is less than 0.5 part by mass, it becomes difficult to adjust the weight, while if it is more than 30 parts by mass, the weight ratio of the resin component becomes small and the resilience tends to be lowered.

The cover of the golf ball of the present invention is preferably formed from a cover composition containing a resin component. The resin component includes, for example, various resins such as an ionomer resin, polyester resin, urethane resins such as a thermoplastic urethane resin or two-component curable urethane resin, polyamide resin or the like; and a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polyurethane elastomer having a commercial name of "Elastollan (registered trademark) (e.g. "Elastollan XNY97A")" commercially available from BASF Japan Ltd.; a thermoplastic styrene elastomer having a commercial name of "Rabalon (registered trademark)" commercially available from Mitsubishi Chemical Corporation. These resin components are used solely or as a mixture of at least two of them.

The ionomer resin preferably includes the resins exemplified as (a-2) or (a-4) components.

The cover composition preferably contains the polyurethane resin (including polyurethane elastomer) or the ionomer resin, as the resin component. The content of the polyurethane resin or the ionomer resin in the resin component of the cover composition is preferably 50 mass % or more, more preferably 60 mass % or more, even more preferably 70 mass % or more.

In the present invention, in addition to the aforementioned resin component, the cover composition may further contain a pigment component such as a white pigment (for example, titanium oxide), a blue pigment, a red pigment, or the like; a weight adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the performance of the cover.

The amount of the white pigment (for example, titanium oxide), with respect to 100 parts by mass of the resin component constituting the cover, is preferably 0.5 part by mass or more, more preferably 1 part by mass or more, and is preferably 10 parts by mass or less, more preferably 8 parts by mass or less. If the amount of the white pigment is 0.5 part by mass or more, it is possible to impart the opacity to the cover. If the amount of the white pigment is more than 10 parts by mass, the durability of the resultant cover may deteriorate.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

In the case of directly injection molding the cover composition, the cover composition extruded in the pellet form beforehand may be used for injection molding or the materials such as the base resin components and the pigment may be dry blended, followed by directly injection molding the blended material. It is preferred to use upper and lower molds having a spherical cavity and pimples for forming a cover, wherein a part of the pimples also serves as a retractable hold pin. When molding the cover by injection molding, the hold pin is protruded to hold the core, and the cover composition which has been heated and melted is charged and then cooled to obtain a cover. For example, it is preferred that the cover composition heated and melted at the temperature ranging from 200° C. to 250° C. is charged into a mold held under the pressure of 9 MPa to 15 MPa for 0.5 to 5 seconds, and after cooling for 10 to 60 seconds, the mold is opened and the golf ball with the cover molded is taken out from the mold.

When molding a cover, the concave portions called "dimple" are usually formed on the surface. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

In the present invention, the thickness of the cover of the golf ball is preferably 2.0 mm or less, more preferably 1.6 mm or less, even more preferably 1.2 mm or less, most preferably 1.0 mm or less. If the thickness of the cover is 2.0 mm or less, the resilience and shot feeling of the obtained golf ball become better. The thickness of the cover is preferably 0.1 mm or more, more preferably 0.2 mm or more, and even more preferably 0.3 mm or more. If the thickness of the cover is less than 0.1 mm, it may become difficult to mold the cover. In addition, the durability and the wear resistance of the cover may deteriorate.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 µm or larger, and more preferably 7 µm or larger, and preferably has a thickness of 25 µm or smaller, and more preferably 18 µm or smaller. If the thickness is smaller than 5 µm, the paint film is easy to wear off due to continued use of the golf ball, and if the thickness is larger than 25 µm, the effect of the dimples is reduced, resulting in lowering flying performance of the golf ball.

When the golf ball has a diameter in a range from 40 mm to 45 mm, a compression deformation amount of the golf ball (shrinking amount of the golf ball in the compression direction thereof) when applying a load from an initial load of 98 N to a final load of 1275 N to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus exhibits the good shot feeling. On the other hand, if the compression deformation amount is 4.0 mm or less, the resilience is enhanced.

The present invention is explained based on the embodiment where the golf ball resin composition of the present invention is used for the core, but the golf ball resin composition of the present invention may be used as the center, the intermediate layers, and the cover. If the center is formed from the golf ball resin composition of the present invention, the intermediate layers may be formed from the resin components exemplified as the cover materials.

EXAMPLES

Hereinafter, the present invention will be described in detail by way of example. The present invention is not limited to examples described below. Various changes and modifications can be made without departing from the spirit and scope of the present invention.

[Evaluation Methods]

(1) Slab Hardness (Shore D Hardness)

Sheets with a thickness of about 2 mm were produced by kneading the blending materials shown in Tables 1 to 3 by a kneader at a temperature of 200° C. for 15 minutes, and hot press molding the kneaded materials at a temperature ranging from 160° C. to 210° C. The sheets were stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(2) Melt Flow Rate (MFR) (g/10 min)

The MFR was measured using a flow tester (Shimadzu flow tester CFT-100C manufactured by Shimadzu Corporation) in accordance with JIS K7210. The measurement was conducted under the conditions of the measurement temperature 190° C. and the load of 2.16 kg.

(3) Rebound Resilience (%)

A Sheet with a thickness of about 2 mm was produced by kneading the blending materials shown in Tables 1 to 3 by a kneader at a temperature of 200° C. for 15 minutes, and hot press molding the kneaded materials at a temperature ranging from 160° C. to 210° C. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type rebound resilience test (testing temperature 23° C., humidity 50 RH %). Preparation of the test piece and the testing method are based on JIS K6255.

(4) Compression Deformation Amount (mm)

A compression deformation amount of the spherical body (a shrinking amount of the spherical body in the compression direction thereof), when applying a load from 98 N as an initial load to 1275 N as a final load to the spherical body, was measured. The compression deformation amount of spherical body No. 19 was defined as an index of 1.00 and the compression deformation amount was represented by converting the compression deformation amount of each golf ball into this index.

(5) Coefficient of Restitution

A 198.4 g of metal cylindrical object was forced to collide with each spherical body at a speed of 40 m/sec, and the speeds of the cylindrical object and the spherical body before and after the collision were measured. Based on these speeds and the mass of each object, coefficient of restitution for each spherical body was calculated. The measurement was conducted by using twelve spherical bodies for each spherical body, and the average value was regarded as the coefficient of restitution for the spherical body.

(6) Shot Feeling

An actual hitting test was carried out by ten amateur golfers (high skilled person) using a driver. Feeling at the shot was evaluated by each person according to the following criteria. Major result of the evaluations of ten golfers was employed as the result of the golf ball.

E (Excellent): Impact is small and feeling is good.
G (Good): Normal feeling.
P (Poor): Impact is large and feeling is poor.

(7) Method for Measuring the Spin-Lattice Relaxation Time (T1) of $^{13}C$ Nucleus Measured by a High Resolution Solid State Carbon Nuclear Magnetic Resonance (NMR) Method Apparatus: Bruker Avance 400
Measuring method: Measurement of the relaxation time (T1) by Torcha method
Measurement frequency: 100.6256207 MHz
Measurement temperature: room temperature
Reference material: adamantane
Number of revolutions of magic angle revolution: 5000 Hz
Pulse width: 4.80 micro sec
Contact time: 2000 micro sec
Pulse interval: 1 micro sec, 100 m sec, 500 m sec, 1 sec, 2 sec, 3 sec, 4 sec, 6 sec, 8 sec, 10 sec, 12 sec, 15 sec, 20 sec, 40 sec, 80 sec, 120 sec
Magnetic field intensity: 9.4 T (8) Measurement of Storage Modulus E' (Pa) and Loss Modulus E" (Pa)

The storage modulus E' (Pa) and the loss modulus E" (Pa) of the golf ball resin composition were measured at the following conditions.

Apparatus: Viscoelasticity measuring apparatus Rheogel-E4000 available from UBM CO., Ltd.
Test piece: A sheet having a thickness of 2 mm was produced by kneading the blending materials shown in Tables 1 to 3 with a kneader at the conditions of 200° C. for 15 minutes, and press molding the kneaded materials and a test piece was cut out to have a width 4 mm and a length between the clamps of 20 mm.
Measuring mode: tensile mode
Measuring temp.: 12° C.
Oscillation frequency: 10 Hz
Measuring strain: 0.05%

[Production of the Spherical Body (Core)]

As shown in Tables 1 to 3, the blending materials were dry blended, followed by mixing with a twin-screw kneading extruder to extrude the blended material in the strand form into the cool water. The extruded strand was cut with a pelletizer to prepare a golf ball resin composition in the form of pellet. Extrusion was conducted in the following conditions: screw diameter=45 mm; screw revolutions=200 rpm; and screw L/D=35. The mixtures were heated to a temperature in a range from 160° C. to 230° C. at a die position of the extruder. The obtained golf ball resin composition in the form of pellet was injection molded at a temperature of 220° C. to prepare a spherical body (core) having a diameter of 40 mm.

TABLE 1

| | | Spherical body No. | | | | | | | | | |
|---|---|---|---|---|---|---|---|---|---|---|---|
| | | 1 | 2 | 3 | 4 | 5 | 6 | 7 | 8 | 9 | 10 |
| Golf ball resin composition | NUCREL AN4319 | 100 | 100 | 100 | 100 | 100 | 100 | 100 | 100 | 100 | 100 |
| | Magnesium hydroxide | 2.7 | 3.8 | 3.8 | 7.2 | 10.7 | 14.3 | 2.7 | 3.8 | 2.7 | 3.8 |
| | Oleyldimethylaminoacetic acid betaine | 30.0 | 30.0 | 70.0 | 70.0 | 70.0 | 70.0 | — | — | — | — |
| | Lauryldimethylaminoacetic acid betaine | — | — | — | — | — | — | 30.0 | 30.0 | 70.0 | 70.0 |
| | Stearyldimethylaminoacetic acid betaine | — | — | — | — | — | — | — | — | — | — |
| | Oleyldimethylaminopropionic acid | — | — | — | — | — | — | — | — | — | — |

TABLE 1-continued

|  |  | Spherical body No. | | | | | | | | | |
|---|---|---|---|---|---|---|---|---|---|---|---|
|  |  | 1 | 2 | 3 | 4 | 5 | 6 | 7 | 8 | 9 | 10 |
|  | betaine | | | | | | | | | | |
|  | Oleamidopropyldimethylaminoacetic acid betaine | — | — | — | — | — | — | — | — | — | — |
|  | Oleyldimethylamine oxide | — | — | — | — | — | — | — | — | — | — |
| Properties | (A-C)/(B-C) | 0.5 | 0.5 | 0.5 | 0.5 | 0.5 | 0.5 | 0.47 | 0.47 | 0.47 | 0.47 |
|  | Total neutralization degree (mole %) | 100 | 121 | 113 | 152 | 194 | 237 | 100 | 118 | 100 | 111 |
|  | Melt flow rate (g/10 min) | 0.2 | 0.1 | 0.4 | 0.3 | 0.2 | 0.2 | 0.2 | 0.1 | 0.4 | 0.3 |
|  | Shore D hardness | 35 | 39 | 19 | 22 | 24 | 25 | 31 | 35 | 19 | 20 |
|  | Rebound resilience (%) | 68 | 71 | 66 | 72 | 78 | 78 | 69 | 68 | 48 | 53 |
|  | Log ($E'/E''^2$) | −5.64 | −5.52 | −5.71 | −5.48 | −5.26 | −5.24 | −5.62 | −5.63 | −6.41 | −6.21 |
|  | T1 Relaxation time (sec) | 3.9 | 3.3 | 4.4 | 3.1 | 2.1 | 2.1 | 3.8 | 3.9 | 13.7 | 9.9 |
|  | Compression deformation amount (index) | 0.68 | 0.53 | 3.09 | 2.05 | 1.77 | 1.53 | 0.92 | 0.68 | 2.94 | 2.63 |
|  | Coefficient of Restitution | 0.851 | 0.884 | 0.831 | 0.894 | 0.955 | 0.960 | 0.857 | 0.854 | 0.638 | 0.694 |
|  | Shot feeling | E | E | E | E | E | E | E | E | E | E |

Formulation: parts by mass

TABLE 2

|  |  | Spherical body No. | | | | | | | |
|---|---|---|---|---|---|---|---|---|---|
|  |  | 11 | 12 | 13 | 14 | 15 | 16 | 17 | 18 |
| Golf ball resin composition | NUCREL AN4319 | 100 | 100 | 100 | 100 | 100 | 100 | 100 | 100 |
|  | Magnesium hydroxide | 2.7 | 3.8 | 3.8 | 2.7 | 2.7 | 2.7 | 2.7 | 2.7 |
|  | Oleyldimethylaminoacetic acid betaine | — | — | — | — | — | — | — | — |
|  | Lauryldimethylaminoacetic acid betaine | — | — | — | — | — | — | — | — |
|  | Stearyldimethylaminoacetic acid betaine | 30.0 | 30.0 | 70.0 | — | — | — | — | — |
|  | Oleyldimethylaminopropionic acid betaine | — | — | — | 30.0 | 70.0 | — | — | — |
|  | Oleamidopropyldimethylaminoacetic acid betaine | — | — | — | — | — | 30.0 | 70.0 | — |
|  | Oleyldimethylamine oxide | — | — | — | — | — | — | — | 30.0 |
| Properties | (A-C)/(B-C) | 0.47 | 0.47 | 0.47 | 0.54 | 0.54 | 0.50 | 0.50 | 0.32 |
|  | Total neutralization degree (mole %) | 100 | 121 | 113 | 100 | 100 | 100 | 100 | 100 |
|  | Melt flow rate (g/10 min) | 0.2 | 0.1 | 0.4 | 0.2 | 0.4 | 0.2 | 0.4 | 0.2 |
|  | Shore D hardness | 36 | 39 | 31 | 36 | 27 | 24 | 25 | 27 |
|  | Rebound resilience (%) | 64 | 64 | 58 | 70 | 60 | 69 | 56 | 63 |
|  | Log ($E'/E''^2$) | −5.78 | −5.78 | −6.04 | −5.56 | −5.94 | −5.6 | −6.09 | −5.83 |
|  | T1 Relaxation time (sec) | 4.9 | 5.0 | 7.5 | 3.5 | 6.4 | 3.7 | 8.2 | 5.4 |
|  | Compression deformation amount (index) | 0.65 | 0.53 | 0.90 | 0.64 | 1.87 | 0.74 | 2.61 | 1.28 |
|  | Coefficient of Restitution | 0.812 | 0.811 | 0.741 | 0.873 | 0.767 | 0.862 | 0.725 | 0.799 |
|  | Shot feeling | E | E | E | E | E | E | E | E |

Formulation: parts by mass

TABLE 3

|  |  | Spherical body No. | | | | | | | | | |
|---|---|---|---|---|---|---|---|---|---|---|---|
|  |  | 19 | 20 | 21 | 22 | 23 | 24 | 25 | 26 | 27 | 28 |
| Golf ball resin composition | NUCREL AN4319 | 100 | 100 | 100 | 100 | 100 | 100 | 100 | 100 | 100 | 100 |
|  | Magnesium hydroxide | — | 1.6 | 2.7 | 3.8 | 5.9 | 9.9 | 13.8 | 6.0 | 9.9 | 13.9 |
|  | Oleyldimethylaminoacetic acid betaine | — | — | — | — | — | — | — | — | — | — |
|  | Lauryldimethylaminoacetic acid betaine | — | — | — | — | — | — | — | — | — | — |
|  | Stearyldimethylaminoacetic acid betaine | — | — | — | — | — | — | — | — | — | — |
|  | Oleyldimethylaminopropionic acid betaine | — | — | — | — | — | — | — | — | — | — |
|  | Oleic acid | — | — | — | — | — | — | — | 70.0 | 70.0 | 70.0 |
|  | Stearic acid | — | — | — | — | 70.0 | 70.0 | 70.0 | — | — | — |
| Properties | (A-C)/(B-C) | — | — | — | — | 1.01 | 10.1 | 1.01 | — | — | — |
|  | Total neutralization degree (mole %) | 0 | 60 | 100 | 140 | 60 | 100 | 140 | 60 | 100 | 140 |
|  | Melt flow rate (g/10 min) | 65.1 | 2.2 | 1.1 | 0.9 | 5.8 | 3.6 | 2.3 | 6.1 | 3.8 | 2.2 |
|  | Shore D hardness | 32 | 50 | 51 | 56 | 54 | 57 | 57 | 24 | 43 | 50 |
|  | Rebound resilience (%) | 44 | 56 | 58 | 60 | 54 | 61 | 62 | 51 | 65 | 73 |

TABLE 3-continued

| | Spherical body No. | | | | | | | | | |
|---|---|---|---|---|---|---|---|---|---|---|
| | 19 | 20 | 21 | 22 | 23 | 24 | 25 | 26 | 27 | 28 |
| Log (E'/E"$^2$) | −6.55 | −6.11 | −6.01 | −5.95 | −6.16 | −5.90 | −5.88 | −6.27 | −5.73 | −5.45 |
| T1 Relaxation time (sec) | 24.0 | 24.0 | 7.3 | 6.5 | 9.3 | 6.0 | 5.9 | 11.0 | 4.6 | 2.9 |
| Compression deformation amount (index) | 1.00 | 1.00 | 0.28 | 0.23 | 0.24 | 0.22 | 0.22 | 1.73 | 0.42 | 0.30 |
| Coefficient of Restitution | 0.449 | 0.449 | 0.747 | 0.766 | 0.705 | 0.778 | 0.783 | 0.676 | 0.824 | 0.902 |
| Shot feeling | E | G | G | P | P | P | P | E | E | G |

Formulation: parts by mass

The materials used in Tables 1 to 3 are follows.

"NUCREL AN 4319": an ethylene-methacrylic acid-butyl acrylate ternary copolymer (melt flow rate (190° C., 2.16 kg): 55 g/10 min, bending stiffness: 21 MPa) available from Du Pont-Mitsui Polychemicals Co., Ltd.

"Oleyldimethylaminoacetic acid betaine": a purified preparation of "Chembetaine OL" (water and salt are removed) available from The Lubrizol Corporation "Lauryldimethylaminoacetic acid betaine": a purified preparation of "Nissan Anon BL" (water and salt are removed) available from NOF Corporation "Stearyldimethylaminoacetic acid betaine": a purified preparation of "Amphitol 86B" (water and salt are removed) available from Kao Corporation "Oleyldimethylaminopropionic acid betaine": synthesized in NARD institute, Ltd. (no commercialized product)

"Oleamidopropyldimethylaminoacetic acid betaine": "Mirataine BET-o" available from Rhodia (water and salt are removed)

"Oleyldimethylamine oxide": "Standamox 01" available from Cognis (water is removed)

"Stearic acid": "powder stearic acid Tsubaki" available from NOF CORPORATION

"Oleic acid": Tokyo Chemical Industry Co., Ltd.

"Magnesium hydroxide": Wako Pure Chemical Industries, Ltd.

As is apparent from Tables 1 to 3, the golf ball resin compositions comprising (A) at least one resin component selected from the group consisting of (a-1) a binary copolymer composed of an olefin and an α,β-unsaturated carboxylic acid having 3 to 8 carbon atoms; (a-2) an ionomer resin consisting of a metal ion neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms, and an α,β-unsaturated carboxylic acid ester; and (a-4) an ionomer resin consisting of a metal ion neutralized product of a ternary copolymer composed of an olefin, an α,β-unsaturated carboxylic acid having 3 to 8 carbon atoms, and an α,β-unsaturated carboxylic acid ester, and (B) a compound having an anionic part within a molecule thereof, provided that the golf ball resin composition further contains (C) a basic inorganic metal compound in the case of containing only (a-1) the binary copolymer and/or (a-3) the ternary copolymer as (A) the resin component, wherein with respect to a metal ion contained in the golf ball resin composition, (A) the resin component and (B) the compound having the anionic part within the molecule thereof, following coordinate energies obtained by ab initio molecular orbital calculation method using a basis function B3LYP/6-31G(d) satisfy a following expression: 0.3≤(A−C)/(B−C)≤0.6, are soft and have a high resilience.

Figure 2:
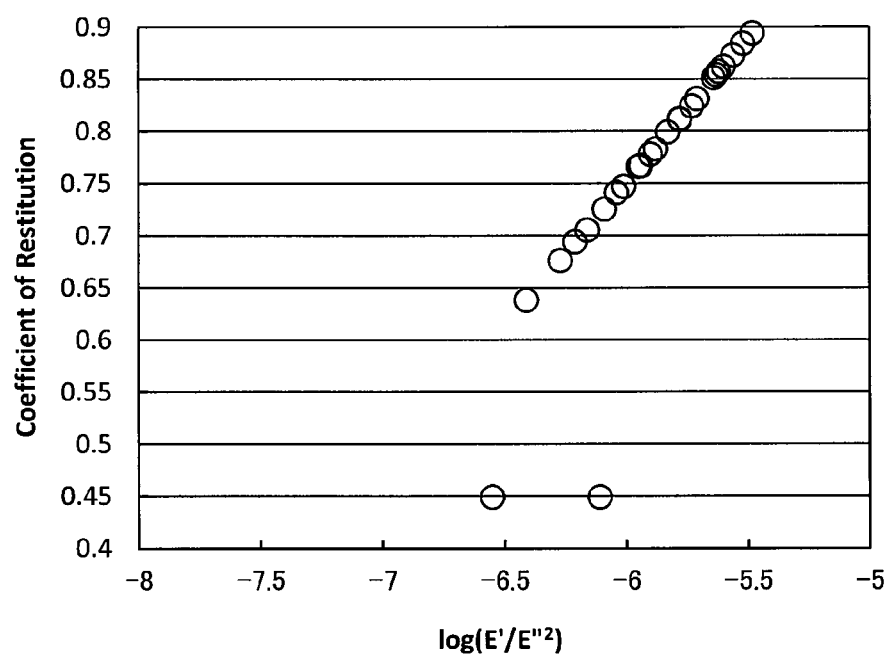
FIG. 2 is a graph showing a relation between coefficient of restitution and log $(E'/E''^2)$.

Coordinate energy A (kcal/mol): coordinate energy between the metal ion and the anionic part of (B) component, Coordinate energy B (kcal/mol): coordinate energy between the metal ion and the carboxyl ion of (A) component, Coordinate energy C (kcal/mol): coordinate energy between the metal ion and the olefin of (A) component FIG. 1 is a graph showing the relation between the coefficient of restitution and relaxation time (T1). The graph shows that as the relaxation time (T1) becomes shorter, the coefficient of restitution becomes higher. In particular, if the relaxation time (T1) is 15 seconds or shorter, cores having higher coefficient of restitution are obtained. FIG. 2 is a graph showing the relation between the resilience and log(E/E"$^2$). The graph shows that as the log(E'/E"$^2$) becomes larger, the coefficient of restitution becomes higher. In particular, when the log(E'/E"$^2$) is −6.55 or more, cores having higher coefficient of restitution are obtained.

According to the present invention, the golf ball resin composition excellent in resilience and flexibility is obtained. Using the golf ball resin composition of the present invention provides golf balls excellent in resilience and shot feeling. This application is based on Japanese Patent Application No. 2011-290329 filed on Dec. 29, 2011, the contents of which are hereby incorporated by reference.

What is claimed is:

1. A golf ball resin composition comprising:
   (A) at least one resin component selected from the group consisting of
   (a-3) a ternary copolymer composed of an olefin, an α,β-unsaturated carboxylic acid having 3 to 8 carbon atoms, and an α,β-unsaturated carboxylic acid ester, and
   (a-4) an ionomer resin consisting of a metal ion neutralized product of a ternary copolymer composed of an olefin, an α,β-unsaturated carboxylic acid having 3 to 8 carbon atoms, and an α,β-unsaturated carboxylic acid ester, and
   (B) at least one amphoteric surfactant selected from the group consisting of lauryldimethylaminoacetic acid betaine, oleyldimethylaminoacetic acid betaine, stearyldimethylaminoacetic acid betaine, oleyldimethylaminopropionic acid betaine, oleamidopropyldimethylaminoacetic acid betaine, oleyldimethylamine oxide, stearyldihydroxymethylbetaine, stearyldihydroxyethylbetaine, lauryldihydroxymethylbetaine, lauryldihydroxyethylbetaine, myristyldihydroxymethylbetaine, behenyldihydroxymethylbetaine, palmityldihydroxyethylbetaine, oleyldihydroxymethylbetaine, coconut oil fatty acid amidopropylbetaine, lauric acid amidoalkylbetaine, 2-alkyl-N-carboxyalkylimidazoliumbetaine, lauric acid amidoalkylhydroxysulfobetaine, coconut oil fatty acid amidodialkylhydroxyalkylsulfobetaine, N-alkyl-β-aminopropionic acid salt, N-alkyl-β-iminodipropionic acid salt, alkyldiaminoalkylglycine, alkylpolyaminoalkylglycine, sodium salt of alkylamino fatty acid, and N,N-dimethylstearylamine oxide, provided that the golf ball resin composition further contains (C) a basic inorganic metal compound if only (a-3) the ternary copolymer is present as (A) the resin component, wherein with respect to the metal ion contained in the golf ball resin composition, (A) the resin component and (B) the amphoteric surfactant, the following coordinate energies obtained by ab initio molecular orbital calculation method using a basis function B3LYP/6-31G(d) satisfy the following expression:

$$0.3 \leq (A-C)/(B-C) \leq 0.6$$

wherein A (kcal/mol) is defined as a coordinate energy between the metal ion and the anionic part of (B) component, B (kcal/mol) is defined as a coordinate energy between the metal ion and the carboxyl ion of (A) component, and C (kcal/mol) is defined as a coordinate energy between the metal ion and the olefin of (A) component, and wherein the golf ball resin composition has a slab hardness ranging from 5 to 27 in Shore D hardness.

2. The golf ball resin composition according to claim 1, wherein the golf ball resin composition contains (B) the amphoteric surfactant in a content ranging from 1 part by mass to 200 pats by mass with respect to 100 parts by mass of (A) the resin component.

3. The golf ball resin composition according to claim 1, wherein (C) the basic inorganic metal compound is at least one selected from the group consisting of magnesium hydroxide, calcium hydroxide, sodium carbonate, lithium carbonate, potassium carbonate, zinc oxide, and copper oxide.

4. The golf ball resin composition according to claim 1, wherein the golf ball resin composition contains (C) the basic inorganic metal compound in a content of 200 parts by mass or less with respect to 100 parts by mass of (A) the resin component.

5. The golf ball resin composition according to claim 1, wherein the golf ball resin composition has a total neutralization degree of 53 mole % or higher, wherein the total neutralization degree is defined by the following expression:

Total Neutralization Degree (mole %)=100×[number of moles of a cation component in (A) the resin component×valence of the cation component+ number of moles of a cation-forming group or a cation component in (B) the amphoteric surfactant×valence of the cation-forming group or the cation component+number of moles of a metal component in (C) the basic inorganic metal compound×valence of the metal component]/[number of moles of the carboxyl group in (A) the resin component+number of moles of an anion-forming group in (B) the amphoteric surfactant×valence of the anion-forming group].

6. A golf ball having a constituent member formed from a golf ball resin composition, wherein the golf ball resin composition comprises:

(A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion neutralized product of a binary copolymer composed of an olefin and an α,β-unsaturated carboxylic acid having 3 to 8 carbon atoms, (a-3) a ternary copolymer composed of an olefin, an 4-unsaturated carboxylic acid having 3 to 8 carbon atoms, and an α,β-unsaturated carboxylic acid ester, and (a-4) an ionomer resin consisting of a metal ion neutralized product of a ternary copolymer composed of an olefin, an α,β-unsaturated carboxylic acid having 3 to 8 carbon atoms, and an α,β-unsaturated carboxylic acid ester, and (B) at least one amphoteric surfactant selected from the group consisting of lauryldimethylaminoacetic acid betaine, oleyldimethylaminoacetic acid betaine, stearyldimethylaminoacetic acid betaine, oleyldimethylaminopropionic acid betaine, oleamidopropyldimethylaminoacetic acid betaine, oleyldimethylamine oxide, stearyldihydroxymethylbetaine, stearyldihydroxyethylbetaine, lauryldihydroxymethylbetaine, lauryldihydroxyethylbetaine, myristyldihydroxymethylbetaine, behenyldihydroxymethylbetaine, palmityldihydroxyethylbetaine, oleyldihydroxymethylbetaine, coconut oil fatty acid amidopropylbetaine, lauric acid amidoalkylbetaine, 2-alkyl-N-carboxyalkylimidazoliumbetaine, lauric acid amidoalkylhydroxysulfobetaine, coconut oil fatty acid amidodialkylhydroxyalkylsulfobetaine, N-alkyl-β-aminopropionic acid salt, N-alkyl-β-iminodipropionic acid salt, alkyldiaminoalkylglycine, alkylpolyaminoalkylglycine, sodium salt of alkylamino fatty acid, and N,N-dimethylstearylamine oxide, provided that the golf ball resin composition further contains (C) a basic inorganic metal compound if only (a-1) the binary copolymer and/or (a-3) the ternary copolymer is present as (A) the resin component, wherein with respect to the metal ion contained in the golf ball resin composition, (A) the resin component and (B) the amphoteric surfactant, the following coordinate energies obtained by ab initio molecular orbital calculation method using a basis function B3LYP/6-31G(d) satisfy a following expression:

$$0.3 \leq (A-C)/(B-C) \leq 0.6$$

wherein A (kcal/mol) is defined as a coordinate energy between the metal ion and the anionic part of (B) component, B (kcal/mol) is defined as a coordinate energy between the metal ion and the carboxyl ion of (A) component, and C (kcal/mol) is defined as a coordinate energy between the metal ion and the olefin of (A) component, and wherein the golf ball resin composition has a slab hardness ranging from 5 to 27 in Shore D hardness.

7. The golf ball according to claim 6, wherein the golf ball resin composition contains (B) the amphoteric surfactant in a content ranging from 1 part by mass to 200 pats by mass with respect to 100 parts by mass of (A) the resin component.

8. The golf ball according to claim 6, wherein the golf ball resin composition contains (a-3) the ternary copolymer composed of the olefin, the 4-unsaturated carboxylic acid having 3 to 8 carbon atoms, and the α,β-unsaturated carboxylic acid ester and/or (a-4) the ionomer resin consisting of the metal ion neutralized product of the ternary copolymer composed of the olefin, the α,β-unsaturated carboxylic acid having 3 to 8 carbon atoms, and the α,β-unsaturated carboxylic acid ester, provided that the golf ball resin composition further contains (C) the basic inorganic metal compound if only (a-3) the ternary copolymer composed of the olefin, the α,β-unsaturated carboxylic acid having 3 to 8 carbon atoms, and the α,β-unsaturated carboxylic acid ester is present as (A) the resin component.

9. The golf ball according to claim 6, wherein the golf ball resin composition contains (C) the basic inorganic metal compound in a content of 200 parts by mass or less with respect to 100 parts by mass of (A) the resin component.

10. The golf ball according to claim 6, wherein the golf ball comprises of at least one layer and a cover covering the core, wherein at least one layer of the core is formed from the golf ball resin composition.

11. The golf ball according to claim 6, wherein the golf ball is a one piece golf ball comprising a one piece golf ball body formed from the golf ball resin composition.

12. A golf ball resin composition comprising:
(A) at least one resin component selected from the group consisting of
(a-1) a binary copolymer composed of an olefin and an α,β-unsaturated carboxylic acid having 3 to 8 carbon atoms,
(a-2) an ionomer resin consisting of a metal ion neutralized product of a binary copolymer composed of an olefin and an α,β-unsaturated carboxylic acid having 3 to 8 carbon atoms,
(a-3) a ternary copolymer composed of an olefin, an α,β-unsaturated carboxylic acid having 3 to 8 carbon atoms, and an α,β-unsaturated carboxylic acid ester, and
(a-4) an ionomer resin consisting of a metal ion neutralized product of a ternary copolymer composed of an olefin, an α,β-unsaturated carboxylic acid having 3 to 8 carbon atoms, and an α,β-unsaturated carboxylic acid ester, and
(B) at least one amphoteric surfactant selected from the group consisting of lauryldimethylaminoacetic acid betaine, oleyldimethylaminoacetic acid betaine, stearyldimethylaminoacetic acid betaine, oleyldimethylaminopropionic acid betaine, oleamidopropyldimethylaminoacetic acid betaine, oleyldimethylamine oxide, stearyldihydroxymethylbetaine, stearyldihydroxyethylbetaine, lauryldihydroxymethylbetaine, lauryldihydroxyethylbetaine, myristyldihydroxymethylbetaine, behenyldihydroxymethylbetaine, palmityldihydroxyethylbetaine, oleyldihydroxymethylbetaine, coconut oil fatty acid amidopropylbetaine, lauric acid amidoalkylbetaine, 2-alkyl-N-carboxyalkylimidazoliumbetaine, lauric acid amidoalkylhydroxysulfobetaine, coconut oil fatty acid amidodialkylhydroxyalkylsulfobetaine, N-alkyl-β-aminopropionic acid salt, N-alkyl-β-iminodipropionic acid salt, alkyldiaminoalkylglycine, alkylpolyaminoalkylglycine, sodium salt of alkylamino fatty acid, and N,N-dimethylstearylamine oxide,
provided that the golf ball resin composition further contains (C) a basic inorganic metal compound if only (a-1) the binary copolymer and/or (a-3) the ternary copolymer is present as (A) the resin component, wherein the golf ball resin composition contains (B) the amphoteric surfactant in a content ranging from 30 parts by mass to 200 pats by mass with respect to 100 parts by mass of (A) the resin component, and wherein with respect to the metal ion contained in the golf ball resin composition, (A) the resin component and (B) the amphoteric surfactant, the following coordinate energies obtained by ab initio molecular orbital calculation method using a basis function B3LYP/6-31G(d) satisfy a following expression:

$$0.3 \le (A-C)/(B-C) \le 0.6$$

wherein A (kcal/mol) is defined as a coordinate energy between the metal ion and the anionic part of (B) component, B (kcal/mol) is defined as a coordinate energy between the metal ion and the carboxyl ion of (A) component, and C (kcal/mol) is defined as a coordinate energy between the metal ion and the olefin of (A) component, and wherein the golf ball resin composition has a slab hardness ranging from 5 to 27 in Shore D hardness.

13. The golf ball resin composition according to claim 12, wherein the golf ball resin composition contains (C) the basic inorganic metal compound in a content of 200 parts by mass or less with respect to 100 parts by mass of (A) the resin component, and (C) the basic inorganic metal compound is at least one selected from the group consisting of magnesium hydroxide, calcium hydroxide, sodium carbonate, lithium carbonate, potassium carbonate, zinc oxide, and copper oxide.

14. The golf ball resin composition according to claim 12, wherein the golf ball resin composition has a total neutralization degree of 53 mole % or higher,
wherein the total neutralization degree is defined by a following expression:

Total Neutralization Degree (mole %)=100×[number of moles of a cation component in (*A*) the resin component×valence of the cation component+ number of moles of a cation-forming group or a cation component in (*B*) the amphoteric surfactant×valence of the cation-forming group or the cation component+number of moles of a metal component in (*C*) the basic inorganic metal compound×valence of the metal component]/[number of moles of the carboxyl group in (*A*) the resin component+number of moles of an anion-forming group in (*B*) the amphoteric surfactant×valence of the anion-forming group].

\* \* \* \* \*